United States Patent [19]

Revill et al.

[11] Patent Number: 4,602,442
[45] Date of Patent: Jul. 29, 1986

[54] SHOE INSOLE AND THE MANUFACTURE THEREOF

[75] Inventors: Howard B. Revill, Oadby; Brian Arnold, Syston, both of England

[73] Assignee: USM Corporation, Flemington, N.J.

[21] Appl. No.: 560,586

[22] Filed: Dec. 12, 1983

[30] Foreign Application Priority Data

Dec. 17, 1982 [GB] United Kingdom ............... 8236010
Sep. 19, 1983 [GB] United Kingdom ............... 8325003

[51] Int. Cl.⁴ .............................................. A43B 13/38
[52] U.S. Cl. .............................................. 36/44; 36/43
[58] Field of Search ...................................... 36/43, 44

[56] References Cited

U.S. PATENT DOCUMENTS

| 2,644,250 | 7/1953 | Ciaio | 36/44 |
| 2,732,324 | 1/1956 | Morris | 36/44 |
| 2,766,158 | 10/1956 | Rinecker | 36/44 |
| 3,835,558 | 9/1974 | Revill | 36/44 |
| 4,192,086 | 3/1980 | Sichak | 36/44 |
| 4,223,458 | 9/1980 | Kihara | 36/44 |

Primary Examiner—Henry S. Jaudon
Assistant Examiner—Mary A. Ellis
Attorney, Agent, or Firm—Thomas S. Szatkowski

[57] ABSTRACT

Shoe insoles comprise two layers of non-woven fibre fleece adhered to an impermeable plastics film. In preferred constructions at least one layer of woven reinforcing fabric is included and more than one plastics film layer may also be included in the insoles.

20 Claims, 4 Drawing Figures

SHOE INSOLE AND THE MANUFACTURE THEREOF

FIELD OF THE INVENTION

This invention relates to shoes insoles and the manufacture thereof.

BACKGROUND OF THE INVENTION

One known shoe construction which is especially suitable for use in the manufacture of sports shoes involves injection moulding a liquid polyurethane material to form, on curing, a shoe sole on an upper carried by an appropriate footform. In carrying out this method the insole material used in shoe manufacture must be sufficiently impervious to the liquid urethane composition to prevent leakage of the urethane material to the inside of the shoe; in addition, the insole needs to be flexible but high in tensile strength both along and across the insole and low in extensibility both along and across the insole, i.e. having good dimensional stability, and, furthermore, as the shoe construction usually involves stitching the insole to the upper, the insole must be readily stitched.

The term "shoe" where used herein is intended to denote outer footwear generally whether ready to wear or in the course of manufacture, as the context permits.

One material which has been used for shoe insoles for sports shoes is made by needling a non-woven fibre fleece to a polypropylene scrim from one side of the scrim (that side which is intended to be adjacent the injected-on sole in the finished shoe); fibres of the non-woven fleece are needled through the scrim and the fibres needled through are coated (on the side of the material nearest to the scrim) by a suitable latex composition which, when dried, provides a coating on the insole of the shoe which has a sufficient degree of resistence to penetration by the liquid urethane composition used in manufacturing the sole. While this known material is reasonably satisfactory in use, it has some disadvantages. For example, in many instances the latex coating is not sufficiently impermeable, tending to lead to leakage of some soling composition to the inside of the shoe which is undesirable. Furthermore, some shoe manufacturers prefer to use the material with the impermeable side adjacent the soling compound—this can cause problems of adhesion of the soling material to the insole material and also lead to a coarser foam structure in the polyurethane soling material as the latex coating hinders dissipation of the gas generated during the urethane foaming process. In addition, needling of the non-woven fleece to the scrim considerably weakens the scrim reducing its tensile strength—although the latex coating recovers the tensile strength to some extent this weakening of the scrim is highly undesirable.

OBJECTS OF THE INVENTION

An object of the invention is to provide an improved shoe insole, especially useful in the manufacture of shoes involving injection moulding a liquid polyurethane to form, on curing, a sole.

SUMMARY OF THE INVENTION

The above and other objects are achieved by providing a shoe insole comprising two layers of non-woven fibre fleece adhered to an impermeable plastic film.

BRIEF DESCRIPTION OF THE DRAWINGS

There now follows a detailed description to be read with reference to the accompanying drawings, of shoe insoles embodying the invention and their manufacture. It will be realised that these insoles have been selected for description by way of example.

In the accompanying drawings.

DESCRIPTION OF THE PREFERRED EMBODIMENT

Figure 1:
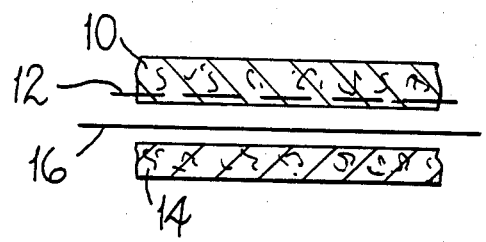
FIGS. 1 to 4 are diagrammatic views showing side fleece, film and reinforcing fabric layers to be laminated to form the insoles.

In one convenient shoe insole construction the plastics film is sandwiched between two layers of non-woven fibre fleece, the layer on the side of the film intended in a finished shoe to be on the inside of the shoe having a minimal amount of fibre, just sufficient to provide a good bond for adhesion of a sock to the insole, while the non-woven fibre fleece on the side of the film intended to be adjacent the outsole in a finished shoe would include the bulk of the fibre, sufficient to give adequate penetration into the fibre of the soling compound to key to the insole material. Alternatively it may be preferred to use two non-woven fibre fleeces of substantially equal substance but of different colours so that the insole could be used in finished shoes with either of the fleeces towards the inside of the shoe depending on the colour requirements for the insole in the particular shoe design in question. In insoles of this type various plastics films may be used, provided that the film has sufficient strength and is sufficiently impermeable to resist penetration of the injected soling compound to the inside of the shoe. Suitable films may include polypropylene, polyethylene, ethylene-acrylic acid copolymer or polyester films. Suitable fibres for use in making the non-woven fibre fleeces include many textile fibres commonly used in manufacture of non-woven fabrics, for example polyester fibres. Although such insoles, i.e. those having a plastics film sandwiched between two layers of non-woven fiber fleece, are satisfactory for use in some shoes, insoles of this structure are lacking in good tensile properties unless thicker films are used in the lamination: this increases the stiffness of the insoles undesirably and may give rise to stitching problems in shoe making.

Accordingly, in preferred shoe insoles in accordance with the invention, a reinforcing fabric, preferably a woven fabric, is used which gives higher strength, retains the flexibility and maintains the ability to stitch the material. In one suitable construction a non-woven fibre fleece is needled to a suitable reinforcing scrim fabric and laminated to a further non-woven fibre fleece by a plastics film of suitable properties the plastics film being adjacent the scrim. Conveniently the scrim is a woven polypropylene tape scrim and where the scrim is polypropylene the plastics film is suitably polypropylene - polypropylene plastics film will stick satisfactorily to the scrim and repair needle damage therein more effectively than plastics film which may be satisfactory in other respects e.g. polyethylene.

In a shoe insole in accordance with the invention instead of a scrim a woven net with an open weave may be used through which an adhesive layer provided by the plastics film can penetrate. Several layers of net may be used to build up sufficient strength. Constructions which may be used in which a woven net reinforcement is included comprise outer layers provided by non-woven needled fibre fleeces, a centre layer provided by a plastics film and, between the plastics film and each of the fleeces, a woven net fabric of open weave.

Conveniently the net is a woven polypropylene net of sufficiently open weave that the plastics material from the plastics film can penetrate the net so that the two plastics film layers bond together and to the non-woven fibre fleece with the polypropylene woven net sandwiched in the centre. An alternative construction uses a single layer plastics film and two outer non-woven fibre needled fleeces with open-weave net layers between the plastics film and each fleece. The plastics of the plastics film penetrates the open weave net and bonds firmly to the needled fleece layers.

The combination of film and fibres is selected to give a final material of desired properties. Thus the plastics film must have a sufficient thickness to give the desired degree of impermeability and the finished insole material must have adequate tensile strength as well as flexibility and other properties necessary for this type of insole, for example adequate ability to key to the soling compound as mentioned above.

In the manufacture of shoe insoles in accordance with the invention suitable sheet material is made in a continuous length and insoles are cut from this material using a cutting die and a cutting press. The sheet materials are made by first forming the non-woven fibre fleeces, for example by air laying, or garnetting and cross-lapping. A plastics film may be introduced in the suitable position between the two non-woven fleece layers either by feeding a pre-formed plastics film between the appropriate layers and bonding the layers to the film, or alternatively and preferably, by extruding the film in molten condition between the layers and feeding an assembly through a suitable calender nip to firmly bond the assembly by the extruded film. Where a preformed film is used, of sufficiently low melting point, the layers with the film sandwiched between the outermost fleece layers, may be fed through a suitable press, for example a drum-and-belt press in which the laminate is pressed by a tensioned belt against the surface of a heated drum to soften the plastics film sufficiently for the fleeces to bond thereto but not so much that the film becomes discontinuous and thus permeable. This method is preferred where the fibres of the fleece and the woven reinforcement (scrim or net) is of fibres of sufficiently high melting point—films of polyethylene or polypropylene may conveniently be used in such cases. However, where the fibres of the fleece, or the reinforcing fabric are of lower melting point e.g. where the polypropylene scrim is to be used with a polypropylene plastics film, this method is not suitable because the temperature necessary to render the polypropylene plastics film adhesive will adversely affect the polypropylene scrim, causing distortion. It may, however, be possible to bond this type of material by point-bonding method e.g. thermal bonding by feeding the laminate through a Ramisch calender (a calender in which at least one of the rolls which is heated has a number of small projections from its surface by which pressure is exerted on materials passing through the nip of the calender). Ultrasonic welding, for example using a Hunter "Pinsonic" machine which utilises a platen having a number of projections to ultrasonically weld the laminate together at the points of contact of the projections, may also be used. Point bonding is especially useful if the plastics film is to be a polyester film for example Mylar supplied by ICI—suitable polyester has a softening point too high for convenient use of the belt and drum method mentioned previously with fibres which are generally suitable for use in manufacture of shoe insole materials.

Thus, where the polypropylene scrim is used in conjunction with a polypropylene plastics film in a construction of the type referred to above, it is preferred to make the polypropylene plastics film by extrusion between the two non-woven fibre fleece layers. Likewise in the above mentioned construction in which an open-weave net is sandwiched between two plastic films with fleece layers on the other side of the films, the plastic films may conveniently be extruded at either side of the woven net and the needled fibre fleeces pressed onto the still molten films using a calender as hereinbefore referred to. This type of lamination can be expected to maximise adhesion to the net and stabilise the net by welding the warp/weft cross-over points. Where the net is of sufficiently open weave it may be possible to utilise only a single extruded plastics film of sufficient thickness to penetrate the net from one side of the net and bond to both of the fibre fleece layers. In this sort of construction it may be possible to use as the plastics film a polyethylene material supplied as a pre-formed film and activated by heat and pressure or extruded, provided that where heat and pressure is used temperatures lower than the heat distortion temperature of the net are involved. In any case lamination by heat and pressure is always a possibility provided that the plastics film can be activated at a temperature such that any reinforcement fabric is sufficiently heat stable.

Although plastics films such as polyethylene or polypropylene are suitable for laminating the layers together in most instances, the tensile strength of polyethylene and polypropylene films is relatively low and not sufficient for some applications without the woven reinforcement hereinbefore mentioned. Polyester films may require less or no reinforcement as polyester has an appreciably higher modulus, gauge for gauge than polyethylene or polypropylene and may therefore be used to give a much more inextensible product; however, as previously mentioned, it is more difficult to bond the fibre fleeces to polyester films.

In all the previously mentioned insole materials the two fleeces may be of identical fibre composition and identical in weight or one fleece may be of a different weight and and/or colour from the other depending on the use to which a shoe insole of the material is to be put.

Although it is preferred to manufacture insoles in accordance with the invention by first making suitable materials in sheet form and then cutting insoles from the sheet it would, in some instances be possible to manufacture individual insoles by first cutting out individually the layers of material and assembling them in the correct order for lamination. However, this would generally be inconvenient and too expensive to be commercially acceptable.

In order to further illustrate the invention by way of example there are described hereinafter shoe insoles made by laminating together fibre fleeces of the type described hereinafter, and thereafter cutting shoe insoles from the sheet materials so made.

In manufacturing the first and second of these illustrative shoe insole materials the fibre fleece intended to be on the inside of the shoe including an insole of such material was a blend of 70 parts by weight "viscose"

rayon fibre and 30 parts by weight polyester fibre, the fleece weighing about 150 grammes per square metre and the fibre fleece intended to be adjacent the outsole in a finished shoe was approximately (by weight) one-third nylon fibre, one-third polyester and one-third acrylic fibre, this fleece weighing about 450 grammes per square meter. In manufacturing the first and second illustrative insole materials the fleeces above referred to were laminated together, using the belt and drum method referred to hereinbefore using a preformed plastics film.

In the first of these illustrative materials the plastics film was a polyethylene film having a weight of 120 grammes per square metre and a gauge of 0.13 mm. The shoe insole material made using this film had an extension underload of 20 pounds per inch width of 6.5% in the "warp" direction and an extension of 30.2% in the "weft" direction. This first shoe insole material has a permeability to water at a water gauge pressure of 30 cm over 9.55 square cm face area, of 0.9 liters per minute. Shoe insoles illustrative of the invention cut from this material are satisfactory for use in certain shoe constructions but are somewhat too extensible for use as insoles in many sports shoes.

The second illustrative shoe insole material utilises as plastics film a polypropylene film having a weight of 28 grammes per square meter and a gauge of 0.03 mm. The extension of this second illustrative shoe insole material under a load of 20 pounds per inch width is 5% in the warp direction and 28.7% in the weft direction. The permeability to water measured in the same way as the first illustrative shoe insole material is 0.4 liters per minute. Although shoe insoles cut from this second illustrative material are less extensible and have reduced permeability it is still desirable that a less extensible material be used. Nevertheless both the first and second materials permit the application of a polyurethane sole by a liquid urethane injection moulding technique as discussed previously, with no significant leakage of the urethane material to the inside of the shoe.

By way of comparison with these first two illustrative materials a single thick fibre fleece corresponding to the two fleeces of the illustrative materials needled together weighed 621 grammes per square meter and had a gauge of 6.1 mm. Under a load of 20 pounds per inch width the extension of this comparative material was 11.7% in the warp direction and 45.7% in the weft direction. The permeability to water of this comparative material under the same conditions as used to measure the permeability of the first and second illustrative materials was 7.8 liters per minute.

A third illustrative material is shown in FIG. 1 of the accompanying drawings. This material comprises a first (coloured) fibre blend which comprises mixed waste acrylic textile fibres which have been garneted and cross lapped to provide a first non-woven fibre fleece 10 needled to a woven reinforcing fabric 12, viz a woven polypropylene tape weighing 85 grammes per square metre supplied by Scott & Fyfe designated as 35/35 grade. The fabric 12 is laminated to a second non-woven fibre fleece by a polyethylene film 16 weighing 95 grammes per square meter. The second non-woven fibre fleece is a needled felt made by garneting and cross lapping mixed natural fibres consisting of 80 parts by weight polyester and 20 parts by weight polypropylene fibres and weighing 100 grammes per square meter. This third shoe insole material had a breaking load in the warp direction of 58 pounds per inch width (10.36 kg per centimeter) and in the weft direction 50 pounds per inch width (8.93 kg per centimeter). The percentage extension under a load of 20 pounds per inch width (3.57 kg per centimeter) was 3.8% in the warp direction and 3.5% in the weft direction the material had a permeability to water, at a water gauge pressure of 30 centimeters over a disc 2.125 inches (5.3975 centimeters) in diameter, that is about 22.9 square centimeters, of 0.8 liters per minute. Shoe insoles cut from this third insole material were more acceptable in performance than those of the first and second materials.

By way of comparison a material already known and used in the prior art comprises a base fabric consisting of the fibre fleece 10 described above, needled to the reinforcing fabric 12 described above and then coated with a styrene butadiene rubber latex to give a dry coating weight of between about 120 to 140 grammes per square centimeters to reduce permeability: this coated material is satisfactory in tensile properties but has too high a permeability.

The third illustrative shoe insole material was made by laminating the layers 10, 12, 14, 16 together using the belt and drum method referred to previously.

Figure 2:
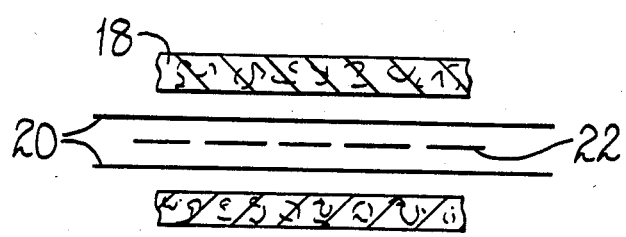
Figure 3:
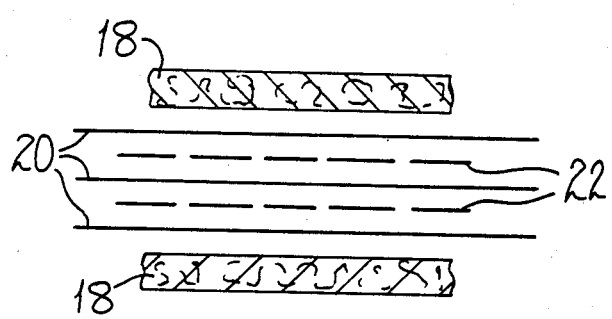

Fourth, fifh and sixth illustrative shoe insole materials will be described hereinafter. The construction of the fourth illustrative material is similar to that of the third material, that is it has two external non-woven fleece layers, a plastics film layer and a reinforcing fabric; however, neither of the non-woven fleece layers are needled to the reinforcing fabric layer but the material is made by merely laying the layers one on top of another. The fifth illustrative material is shown in FIG. 2 of the accompanying drawings and comprises two external non-woven fibre fleeces 18, each adjacent a plastics film 20 layer, the two plastics film layers being separated by a woven reinforcing fabric 22. Finally the sixth illustrative shoe insole material is shown in FIG. 3 of the accompanying drawings and comprises two external non-woven fibre fleece 18 layers adjacent plastics film 20 layers alternating with layers of woven reinforcing fabric 22.

In the fourth, fifth and sixth illustrative shoe insole materials the non-woven fibre fleeces used on both side of the material are identical and comprise 70 parts by weight viscose rayon textile fibres and 30 parts by weight acrylic textile fibres, the fibres having been garneted and cross-lapped to form a non-woven fibre fleece having a weight of about 150 grammes per square meter. The woven reinforcing fabric is a woven polypropylene net fabric supplied by Scott & Fyfe under the designation "Bacloc" and weighing about 73 grammes per square meter. The plastics film used is a low density polyethylene film weighing 140 grammes per square meter.

Th fourth, fifth and sixth illustrative shoe insole materials were made in a static press having platens heated to a temperature of about 130 degrees, the press applying only minimal pressure to the layers and the dwell t ime in the press being half-a-minute, this being sufficient to activate the polyethylene film to adequately bond the various layers together. Although the fourth, fifth and sixth illustrative materials were made in static press, they could equally well have been made using the drum and belt method hereinbefore referred to.

The properties of the fourth, fifth and sixth illustrative shoe insole materials are set out in the following Table 1:

| Shoe Insole Material | Breaking Load 1 lb/in (kg/cm) | | % Ext At 20 lb/in (3.57 kg/cm) | | Permeability (l/min) |
|---|---|---|---|---|---|
| | Warp | Weft | Warp | Weft | |
| Fourth | 112 (20) | 80 (14.28) | 2.2 | 2.0 | 0.6 |
| Fifth | 113 (20.18) | 70 (12.50) | 1.6 | 1.6 | 0.8 |
| Sixth | 172 (30.71) | 157 (28.04) | 1.0 | 1.1 | 0.6 |
| | (17.86) | (17.86) | | | |

Shoe insoles cut from the fourth, fifth and sixth illustrative shoe insole materials were highly satisfactory in use.

Although the illustrative materials were made using a pre-formed plastics film otherwise similar materials could be made by extruding a suitable plastics film between the other layers and applying pressure to the assembly by passng it through a calender nip whilst the extruded film is still adhesive to ensure good bonding together of the layers.

Figure 4:
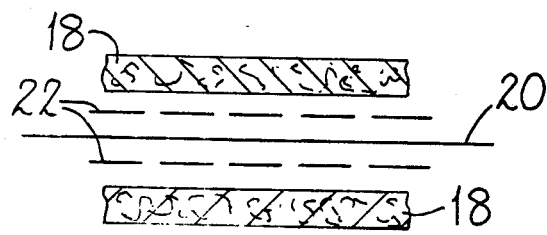

FIG. 4 shows a further construction of insole material comprising two external non-woven fibre fleeces 18 adjacent to layers of woven reinforcing fabric 22, a single plastics film layer 20 being sandwiched between the reinforcing fabric layers and bonding the assembly together. The layers 18 and 22 are similar to the corresponding layers described with reference to the fourth, fifth and sixth illustrative materials; however in this construction it may be necessary to use a plastics film of somewhat heavier weight.

Although the non-woven fibre fleeces used in the manufacture of the illustrative material described hereinbefore are made by garneting and cross-lapping, non-woven fibre fleeces made by other standard methods may be utilised for example made by air laying and the fleeces may be needled to give satisfactory laminar strength; it is envisaged that for some purposes a stitch-bonded non-woven fleece may be used. However, in order to retain the properties desired of the shoe insoles, it is preferred that non-woven fibre fleece have no(or very little) impregnation of bonding agent.

Materials using stitch bonded fleeces without any woven reinforcing fabric, laminated by extruded polypropylene film have been found to give sufficient impermeability but are too extensible at polypropylene film weights up to about 150 gramme per square metre: higher weights of polypropylene reduce the extensibility but increase the stiffness and it is questionable if stitching of these high weight materials can be satisfactorily accomplished.

Although the non-woven fibre fleeces used are preferably made from textile fibres, one of the fleece layers may be of different construction e.g. a spun-bonded layer.

Where reinforcing fabric is used which is a polypropylene scrim of a close weave, the scrim may be treated by dipping in a suitable impregnant composition, e.g. an aqueous styrene-butadiene rubber dispersion which is subsequently dried, to provide a priming layer on each face of the scrim. The priming layers are thus interconnected by penetration of the dispersion through the scrim: this facilitates bonding to the polypropylene scrim which might otherwise prove difficult.

Having thus described my invention, what I claim as new and desire to secure by letters Patent of the United States is:

1. A flexible shoe insole comprising at least two layers of plastics film, a reinforcing fabric layer is sandwiched between each adjacent two layers of plastics film and two layers of non-woven fibre fleece, the fleeces being adhered one at either side of the outermost films.

2. An insole according to claim 1 wherein each reinforcing layer has openings therethrough to permit the plastics films to adhere to one another.

3. A flexible shoe insole comprising a plurality of alternating layers of platics films and reinforcing fabric with openings therein, the plastics film layers adhering to the adjacent reinforcing fabric layers and, through the openings, to the adjacent plastics film layers, and two layers of non-woven fibre fleece, the fleeces being adhered one at either side of the outermost films.

4. An insole according to claim 1 or 3 wherein one of the fleece layers is needled to the reinforcing fabric.

5. An insole according to claim 1 or 3 wherein the reinforcing fabric is a woven scrim.

6. An insole according to claim 1 or 3 wherein the reinforcing fabric is polypropylene.

7. An insole according to claim 1 or 3 wherein the reinforcing fabric is an open weave net.

8. An insole according to claim 1 or 3 wherein the weight of reinforcing fabric in the insole lies between 50 and 300 grammes per square meter.

9. An insole according to claim 1 or 3 wherein the plastics film is polyethylene.

10. An insole according to claim 1 or 3 wherein the plastics film is polypropylene.

11. An insole according to claim 1 or 3 wherein the plastics film is polyester.

12. An insole according to claim 1 or 3 wherein the weight of plastics film in the insole lies between 50 and 400 grammes per square meter.

13. An insole according to claim 12 wherein the weight of plastics film in the insole lies between 100 and 200 grammes per square meter.

14. An insole according to claim 1 or 3 wherein the weight of each fibre fleece is between 80 and 300 grammes per square meter.

15. An insole according to claim 1 or 3 wherein the total weight of the fibre fleeces does not exceed 500 grammes per square meter.

16. An insole according to claim 1 or 3 in which the fibre fleece comprises 'Viscose' rayon fibres.

17. An insole according to claim 1 or 3 in which the fibre fleece comprises acrylic fibres.

18. An insole according to claim 1 or 3 in which the fleece comprises polyester fibres.

19. An insole according to claim 1 or 3 in which the fibres of one of the fibre fleeces are a different colour from those of the other fleece.

20. A shoe insole material from which a shoe insole according to claim 1 or 3 is cut.

* * * * *